United States Patent [19]

Okuni et al.

[11] Patent Number: 4,706,725
[45] Date of Patent: Nov. 17, 1987

[54] PNEUMATIC SEMI-RADIAL TIRES FOR MOTORCYCLES

[75] Inventors: Shinichiro Okuni, Akishima; Yoichi Kitazawa, Higashiyamato, both of Japan

[73] Assignee: Bridgestone Tire Company Limited, Tokyo, Japan

[21] Appl. No.: 574,645

[22] Filed: Jan. 30, 1984

Related U.S. Application Data

[63] Continuation of Ser. No. 397,332, Jul. 12, 1982, abandoned.

[30] Foreign Application Priority Data

Aug. 4, 1981 [JP] Japan ................................ 56-121324

[51] Int. Cl.$^4$ .......................... B60C 9/00; B60C 15/06
[52] U.S. Cl. .................................. 152/541; 152/546; 152/554; 152/555
[58] Field of Search ........... 152/352 R, 352 A, 353 R, 152/353 C, 353 G, 354 R, 354 RB, 355, 356 R, 356 A, 359, 360, 361 R, 361 FP, 361 DM, 362 R, 362 CS, 374, 209 R, 541, 546, 554, 555

[56] References Cited

U.S. PATENT DOCUMENTS

| | | |
|---|---|---|
| 3,881,538 | 5/1975 | Mirtain .................... 152/361 DM |
| 3,896,869 | 7/1975 | Fujishima et al. ............ 152/361 R |
| 3,961,657 | 6/1976 | Chrobak ........................... 152/355 |
| 3,982,580 | 9/1976 | Inone et al. ................... 152/361 R |
| 4,047,552 | 9/1977 | Maeda et al. .................. 152/361 R |
| 4,086,948 | 5/1978 | Suzuki et al. ...................... 152/355 |
| 4,096,899 | 6/1978 | Kitazawa et al. ............... 152/362 R |
| 4,202,393 | 5/1980 | Ikeda et al. .................... 152/362 R |
| 4,235,274 | 11/1980 | Suzuki et al. .................. 152/354 R |
| 4,258,775 | 3/1981 | Samoto .......................... 152/354 R |
| 4,263,955 | 4/1981 | Ikeda .............................. 152/362 R |
| 4,352,383 | 10/1982 | Matsumoto et al. ........... 152/362 R |

FOREIGN PATENT DOCUMENTS 1191575 5/1970 United Kingdom ................ 152/356
1222759 2/1971 United Kingdom ............ 152/356 R

OTHER PUBLICATIONS

Yoshida et al., "Stability and Steering Response in Two-Wheeled Vehicles", Journal of the Society of Automotive Engineers of Japan, 1972, vol. 26.
Kageyama, "Tire, Brake", Series of Automobile Engineering, #12.
Takahashi et al., "Straight Running Motorcycle Weaving Response", SAE Technical Paper Series, 1984.

Primary Examiner—Michael Ball
Attorney, Agent, or Firm—Sughrue, Mion, Zinn, Macpeak, and Seas

[57] ABSTRACT

A pneumatic semi-radial tire for motorcycle is disclosed, which comprises a tread, a pair of sidewalls, a carcass composed of at least one rubberized ply containing organic fiber cords inclined at an angle of 50°–85° with respect to the equatorial plane of the tire, and a belt disposed between said tread and said carcass at a width corresponding to a tread width and composed of at least two rubberized plies each containing cords with a modulus of elasticity of at least 600 kg/mm$^2$ arranged at an inclination angle of 15°–30° with respect to the equatorial plane of the tire. In the tire, each end of at least one rubberized ply constituting the carcass is wrapped around a bead ring embedded in each radially inner end portion of the sidewalls toward a direction of the tread to form a turnup portion in which cords of the carcass are crossed with cords of the turnup portion in the sidewall; a stiffener inclusive of a tapered rubber filler extending from an upper part of the bead ring toward the tread direction and having a Shore A hardness of at least 60° is disposed between the carcass and the turnup portion thereof or outside the turnup portion; and at least one of radial heights extending from the bead base to ends in the tread direction of the stiffener and turnup portion corresponds to at least 60% of the radial height of the sidewall.

10 Claims, 7 Drawing Figures

PNEUMATIC SEMI-RADIAL TIRES FOR MOTORCYCLES

This application is a continuation of application Ser. No. 397,332, filed July 12, 1982, now abandoned.

This invention relates to pneumatic semi-radial tires for motorcycles.

In general, it is known that a radial tire comprises one or a few carcass plies each containing fiber or metal cords arranged in a direction of 90° with respect to the equatorial plane of the tire (or a radial direction), and a belt disposed as an unextensible layer between the carcass and tread and composed of plural rubberized plies each containing metal cords or the like inclined at a small angle with respect to the equatorial plane of the tire, the cords of which being crossed with each other. Moreover, so-called semi-radial tires are constructed by inclining only the fiber or metal cords in the carcass ply of the tire having the aforementioned structure at an angle of about 80° with respect to the equatorial plane of the tire.

Furthermore, it is known that the radial and semi-radial tires of the above structures have some excellent performances as compared with usually used bias tires (i.e. tire comprises plural carcass plies each containing fiber cords inclined at an angle of about 35° with respect to the equatorial plane of the tire, the cords of which being crossed with each other), i.e. they are good in ride feeling because of considerable flexibility of the sidewall portion. Also high cornering performance or good cornering stability and a good wear resistance are obtained because the rigidity is given by the belt provided on the crown portion of the tire. However, these facts are applied only to tires for four-wheeled vehicles.

If it is intended to use the radial tire in motorcycles, there is a problem relating to the cornering stability, so that there has been no application of the radial tire construction to the motorcycle up to now. Because, the motorcycle is susceptible to the insufficient camber thrust acting on the tire in cornering and an external disturbance mainly acting on the tire in the straight running. That is, when the body of the motorcycle is inclined toward the cornering side during the cornering, a camber angle (an inclination angle of the equatorial plane of the tire with respect to a plane perpendicular to horizontal plane) is given to the tire, whereby a camber thrust opposes a centrifugal force acting to the horizontal plane and produced between the tire and the road surface. The cornering performance of the motorcycle is largely dependent upon the magnitude of camber thrust. The camber thrust of the radial tire, which is insignificant in four-wheeled vehicles, is about $\frac{1}{2}$ to $\frac{2}{3}$ of that of the bias tire. This is due to the fact that the sidewall of the radial tire is considerably flexible as a whole as compared with that of the bias tire. Such a flexible sidewall susceptibly responds to an external disturbance in the straight running, which causes the deterioration of the cornering stability in the motorcycles frequently running at high speed. This deterioration of cornering stability is accompanied with a fatal drawback causing potential injury to a rider, which is entirely different from the case of applying the radial tire to a four-wheeled vehicle.

The inventors have made various studies with respect to semi-radial tires for use in motorcycles and found that the above drawback can be eliminated by giving a unique reinforcing structure to the sidewall of the tire as a center and also the effect of improving wet skid resistance is obtained to such an extent that it has never been attained in the bias tire.

According to the invention, there is the provision of in a pneumatic semi-radial tire for motorcycle comprising a tread, a pair of sidewalls toroidally extending from said tread, a carcass reinforcing these tread and sidewalls and composed of at least one rubberized ply containing organic fiber cords inclined at an angle of 50°–85° with respect to the equatorial plane of the tire, said tread being extended between said sidewalls up to both positions corresponding to the maximum width of the tire parallel to said carcass at substantially an equal thickness, and a belt disposed between said tread and said carcass at a width corresponding to a tread width and composed of at least two rubberized plies each containing cords with a modulus of elasticity of at least 600 kg/mm² arranged at an inclination angle of 15°–30° with respect to the equatorial plane of the tire, said cords of which being crossed with each other, wherein each end of at least one rubberized ply constituting said carcass is wrapped around a bead ring embedded in each radially inner end portion of said sidewalls toward a direction of said tread to form a turnup portion in which cords of said carcass are crossed with cords of said turnup portion in said sidewall;

a stiffener inclusive of a tapered rubber filler extending from an upper part of said bead ring toward said tread direction and having a Shore A hardness of at least 60° is disposed between said carcass and said turnup portion thereof or outside said turnup portion; and at least one of radial heights extending from the bead base to ends in the tread direction of said stiffener and turnup portion corresponds to at least 60% of the radial height of said sidewall.

BRIEF DESCRIPTION OF THE DRAWINGS

The invention will now be described in detail with reference to the accompanying drawings, wherein.

DESCRIPTION OF THE PREFERRED EMBODIMENTS

Figure 1:
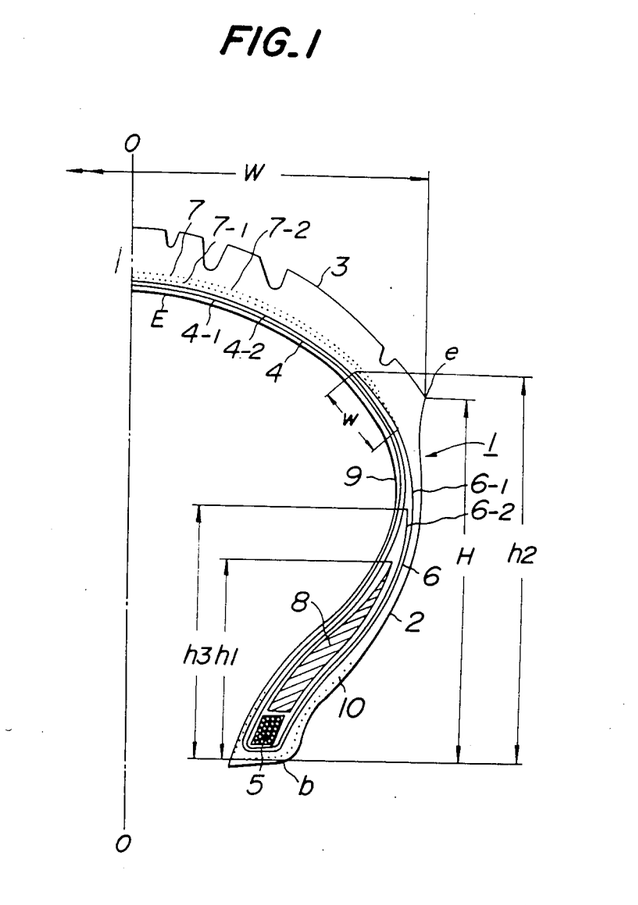
FIGS. 1–4 are schematic radial half sections of four embodiments of the pneumatic semi-radial tire for motorcycle according to the invention, respectively.

In FIG. 1 is schematically shown a radial half section of a first embodiment of the pneumatic semi-radial tire according to the invention, wherein a tire 1 is formed by toroidally connecting a sidewall 2 to a tread 3. While the left half section of the tire is omitted with respect to an equatorial plane O—O of the tire, the tire is symmetrical with respect to the equatorial plane. The sidewall 2 and tread 3 as a whole are reinforced with a carcass 4. In this embodiment, the carcass 4 is composed of two plies $4_{-1}$ and $4_{-2}$, each end of which is wrapped around a bead ring 5 embedded in each radially inner end portion of the sidewall 2 from inside toward outside in the axial direction of the tire to form a turnup portion 6.

The carcass 4 is composed of at least one rubberized ply containing cords of an organic fiber such as nylon, rayon, polyester or the like inclined at an angle of 50°–85°, preferably 60°–75° with respect to the equatorial line O—O. When the carcass is composed of single rubberized ply, the turnup portion is formed so that the cords of the carcass are crossed with the cords of the turnup portion in the sidewall. When the carcass is composed of two or three or possibly four rubberized plies, the cords of these plies are crossed with each other. The carcass plies have both ends of at least one ply wrapped around the bead rings 5 toward outside in the axial direction of the tire to form turnup portions 6. In the illustrated embodiment, two carcass plies $4_{-1}$ and $4_{-2}$ are wrapped around the bead ring 5 to form a higher turnup portion $6_{-1}$ and a lower turnup portion $6_{-2}$, respectively.

The tread 3 extends from the position of the equatorial plane O—O toward both sides thereof at substantially an equal thickness. In this case, a tread width W starting from a tread end e corresponds to a maximum width of the tire.

A belt 7 is disposed on a crown portion E of the carcass 4 beneath the tread 3 to reinforce the whole region of the tread 3. In this case, the belt 7 may somewhat extend over the tread end e toward the sidewall 2. The belt 7 is composed of plural rubberized plies each containing cords with a modulus of elasticity of not less than 600 kg/mm² arranged at an inclination cord angle of 15°–30° with respect to the equatorial plane O—O, the cords of which being crossed with each other.

The term "modulus of elasticity of cord" used herein is calculated by the following equation when a relation between load and elongation is measured by applying a tensile force to the cord and a rising slope of the measured load-elongation curve is extended from this curve to determine a load at 10% elongation:

$$\text{Modulus of elasticity of cord} = \frac{F \times 10}{S}$$

wherein F is a load at 10% elongation and S is a sectional area of cord. In this connection, the modulus of elasticity of each of conventionally known cords is exemplified as follows:

| Nylon-6 | 285 kg/mm² |
|---|---|
| Nylon-66 | 345 kg/mm² |
| Polyester | 456 kg/mm² |
| High-modulus polyester*[1] | 600 kg/mm² |
| Rayon | 650 kg/mm² |
| Kevlar*[2] | 3,700 kg/mm² |
| Steel | 16,000 kg/mm² |

*[1]cord of low polymerization degree polyethylene terephthalate having an intrinsic viscosity of 0.3–0.8 as measured in a solvent of o-chloro-phenol at a temperature of 25° C.;
*[2]cord of aromatic polyamide fiber, made by Du Pont Nemours, E.I.

In the illustrated first embodiment, the belt 7 is composed of two plies $7_{-1}$ and $7_{-2}$. As the reinforcing member for the belt, there are considered the case of using metal cords or fiber cords alone in both the plies $7_{-1}$ and $7_{-2}$, the case of using fiber cords in the ply $7_{-1}$ and using metal cords in the ply $7_{-2}$, and the like.

Figure 5:
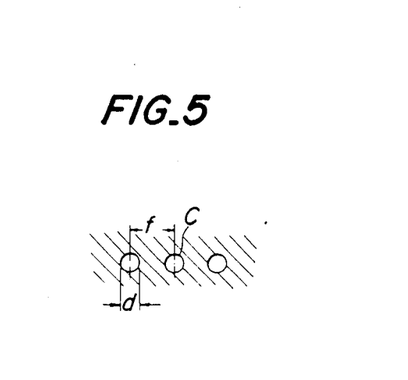
FIG. 5 is a partial enlarged view of the metal cord ply for the belt used in the invention.

Concerning metal cord, it is desirable to use steel cord obtained by twisting 6 to 25 steel filaments, each having a diameter of not more than 0.15 mm, with each other. Concretely, the diameter of the steel filament is 0.15 mm, 0.12 mm or 0.10 mm. Furthermore, when the metal cord is used in the plies for the belt, it is preferable to arrange the metal cords at a spacing ratio of 35–65%, and in this case the flexural rigidity of the cord is not increased excessively in the thickness direction of the belt. The spacing ratio of metal cords is defined by the following equation as shown in FIG. 5:

$$\text{Spacing ratio} = \frac{f - d}{f} \times 100(\%)$$

wherein f is a center distance between cords C and d is a diameter of cord C.

According to the invention, a tapered rubber filler 8 extending from the upper part of the bead ring 5 toward a direction of the tread 3 is disposed between the carcass 4 and the turnup portion 6 thereof. The rubber filler 8 has a Shore A hardness of at least 60°, preferably not less than 65°. The upper limit of the hardness is not critical in view of tire performance, but when the hardness is higher than about 98°, the working efficiency becomes undesirably poor in view of tire production.

When radial heights extending from a bead base b to ends in tread direction of the rubber filler 8 and turnup portions $6_{-1}$ and $6_{-2}$ are $h_1$, $h_2$ and $h_3$, respectively and a height of the sidewall expressed by a radial distance from the bead base to the tread end e is H, at least one of heights $h_1$, $h_2$ and $h_3$ according to the invention corresponds to at least 60% of the height H of the sidewall. In FIG. 1, the height $h_1$ of the rubber filler is 55% of the height H, the height $h_2$ of the higher turnup portion layer is 107% of the height H, and the height $h_3$ of the lower turnup portion is 70% of the height H. In this embodiment, the heights $h_2$ and $h_3$ exceed the standard value 60% and also the height $h_1$ of the rubber filler 8 is a higher level, so that a flex zone 9 of the sidewall 2 is forced toward the direction of the tread 3 and at the same time the deformation of the flex zone 9 itself is restrained by overlapping the end part of the turnup portion $6_{-1}$ with the belt 7, whereby the cornering stability is further improved. For this purpose, it is desirable that an overlap width w of the end part of the turnup portion 6 to the belt 7 is at least 10 mm and the height $h_1$ of the rubber filler is within a range of 50–75% of the height H of the sidewall.

In FIG. 1, reference numeral 10 is a chafer composed of fiber cords or a woven fabric serving to prevent rim chafing and to reinforce the lower part of the sidewall.

Figure 2:
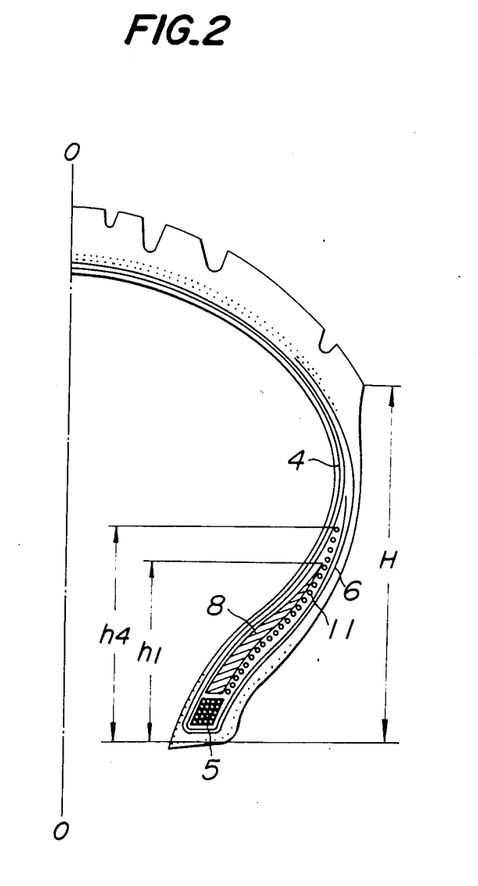

In FIG. 2 is schematically shown a second embodiment of the pneumatic semi-radial tire according to the invention.

In this second embodiment, a cord reinforcing layer 11 is disposed adjacent to the rubber filler 8 from a position near the bead ring 5 toward the tread direction. In the cord reinforcing layer 11, the fiber or metal cords are arranged at an inclination angle of 15°–30° with respect to the circumferential direction of the tire. In this case, the value of the inclination angle is measured in the vicinity of the bead ring. The cord reinforcing layer 11 may be arranged outside the turnup portion 6 of the carcass. However, it is desirable to arrange the cord reinforcing layer 11 adjacent to the turnup portion 6 between the carcass 4 and the turnup portion thereof as a stiffener consisting of a composite structure with the rubber filler as shown in FIG. 2. In the latter case, it is preferable that at least one of heights $h_1$ and $h_4$ is within a range of 50–75% of the height H. In the embodiment of FIG. 2, the height $h_1$ is 55% of the height H and the height $h_4$ is 61% of the height H.

Figure 3:
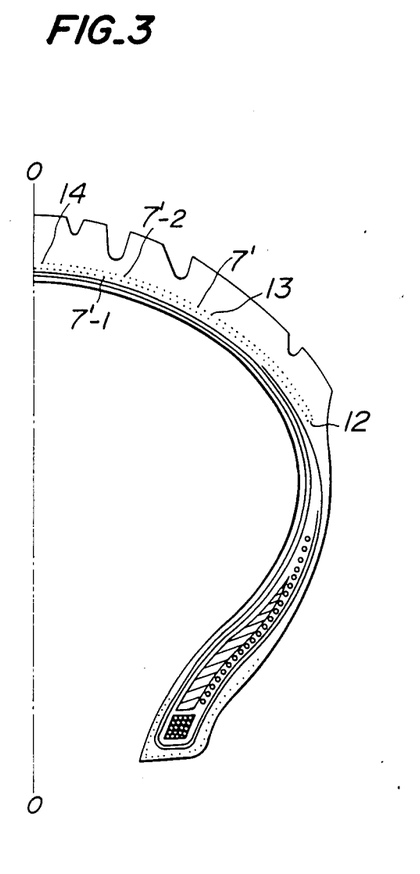

In FIG. 3 is schematically shown a third embodiment of the pneumatic semi-radial tire according to the invention.

In this embodiment, two plies $7'_{-1}$ and $7'_{-2}$ are formed as a belt $7'$ by turning a single rubberized fiber cloth layer around the tread end e (or turn-over point 12) in the direction of the tread 3 and folding in a direction of the equatorial plane O—O to form a fold part 13. In this case, both free ends 14 of the belt $7'$ are opposite to each other in the vicinity of the equatorial plane O—O as shown in FIG. 3. Moreover, both free ends 14 may be overlapped with each other. As regards the folding of the ply for the belt, there may be used various means in addition to the embodiment of FIG. 3 without departing the spirit of the invention. For instance, when using two plies as shown in FIG. 1, one of these plies is made wider than the other ply and both free ends thereof are folded in a direction of the tread or carcass by the conventionally well-known method for the formation of belt structure in pneumatic radial tires for four-wheeled vehicles. Furthermore, each free end of the ply is enveloped with the folded part of the other ply.

Figure 4:
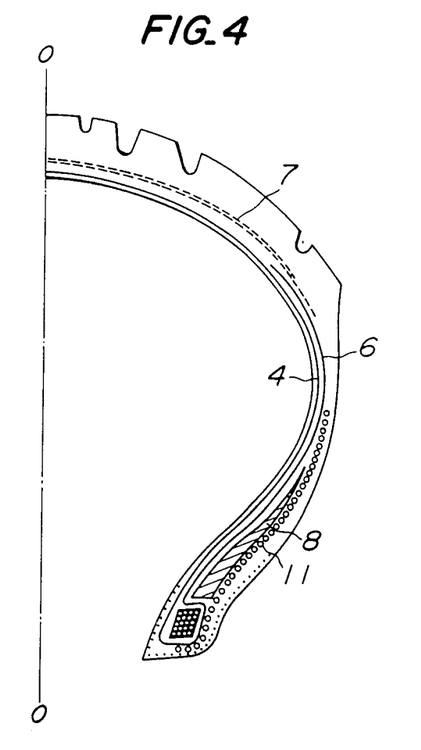

In FIG. 4 is schematically shown a fourth of the pneumatic radial tire according to the invention.

In this embodiment, each end of the carcass 4 is wrapped around the bead ring 5 from inside toward outside to form the turnup portion 6 extending closely along the carcass 4 toward the vicinity of the end part of the belt 7. Furthermore, the rubber filler 8 and the cord reinforcing layer 11 are disposed outside the turnup portion 6, respectively.

The invention will be described with reference to results of comparative test between the tire according to the invention and the conventional bias-structured tire.

Figure 6:
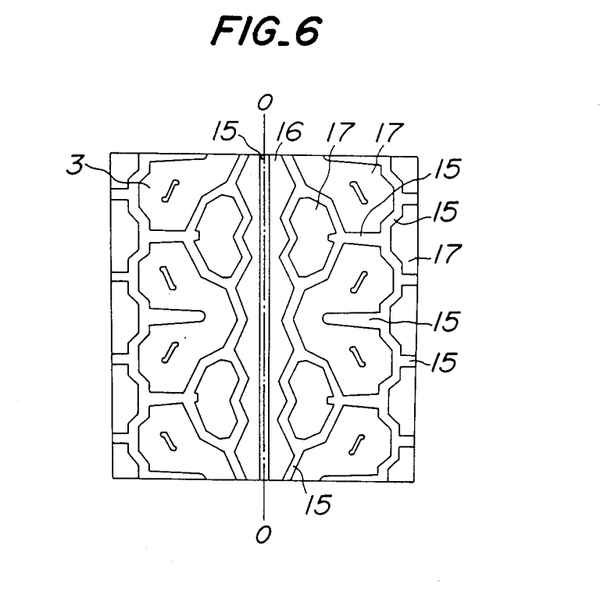
FIG. 6 is a plan view of an embodiment of the tread pattern used in the pneumatic semi-radial tire for motorcycle according to the invention.

In this comparison test, a tire to be mounted on a front wheel of a motorcycle had a size of 3.25 H 19 and a tread pattern formed in a tread divided into plural ribs by eight straight grooves extending circumferentially of the tread, while a tire to be mounted on a rear wheel of the motorcycle had a size of 130/90-16 and a tread pattern formed in a tread (3) divided into ribs 16 and blocks 17 by grooves 15 having various shapes as shown in FIG. 6. To these front and rear tires were applied the tire according to the invention and the conventional tire, respectively. The tires having sizes of 3.25 H 19 and 130/90-16 had the same dimensions for tire structure as shown in the following Table 1.

TABLE 1

| | Structure | Tire according to the invention | Conventional tire |
|---|---|---|---|
| Carcass 4 | kind of cord | nylon 840 d/2 | nylon 1,260 d/2 |
| | ply number | 2 | 3 |
| | cord angle (°) | 75 | 30 |
| Belt 7 | kind of cord | steel filament of 0.12 mm diameter, twisting 3 × 4 | — |
| | ply number | 2 | — |
| | cord angle (°) | 25 | — |
| Rubber filler 8 | hardness (°) | 70 | — |
| | $(h_1/H) \times 100$ (%) | 55 | — |
| Turnup portion 6 | $(h_2/H) \times 100$ (%) | 105 | not more than 35 |
| | $(h_3/H) \times 100$ (%) | 70 | |

Moreover, when the tire according to the invention was used as both the front and rear tires, the relationship among the ply for belt, rubber filler and turnup portion of carcass were the same as shown in FIG. 1.

The results of the comparative test are shown in the following Table 2, wherein each of the numerical values is expressed by an index on the basis that the conventional tire is 100 and the larger the value, the better the property.

TABLE 2

| Properties | Tire according to the invention | Conventional tire |
|---|---|---|
| Camber thrust | 105 | 100 |
| Durability at high speed | 110 | 100 |
| Wear resistance | 120 | 100 |
| Susceptibility to external disturbance | 110 | 100 |
| Wet skid resistance | 120 | 100 |

In the comparative test, the evaluation for each property of the tire is as follows:

(1) Camber thrust

In the rear tire of size 130/90-16, camber thrusts were measured at camber angles of 10°, 20°, 30° and 40° under conditions of an internal pressure of 2.8 kg/cm$^2$ and a load of 307 kg, respectively. The property was evaluated by an average value of the measured camber thrusts.

(2) Durability at high speed

The tire as described in the above item (1) was run on a steel drum having a smooth surface with a diameter of 1.6 m under the same conditions as described above at a speed of 180 km/hr for 10 minutes, and then the running was continued by raising the running speed at a rate of 10 km/hr every 10 minutes. The property was evaluated by the running speed causing tire failure.

(3) Wear resistance

This property was evaluated after the motorcycle provided with the test tire was practically run on a circuit course of 4.3 km at an average speed of 100 km/hr over a distance of 500 km. The internal pressure was 2.0 kg/cm$^2$ in the front tire and 2.2 kg/cm$^2$ in the rear tire.

(4) Susceptibility to external disturbance

This property was evaluated by a test driver after the motorcycle was run on the circuit course as described above at a maximum speed of 200 km/hr. The internal pressures of the front and rear tires were the same as described in the above item (3).

(5) Wet skid resistance

The motorcycle circled at a radius of 30 m on wetted skid pad, during which a slip limiting speed was measured for the evaluation. The internal pressures of the front and rear tires were the same as described in the item (3).

As apparent from Table 2, the pneumatic semi-radial tire for motorcycle according to the invention is considerably superior in the properties to the conventional tire.

Figure 7:
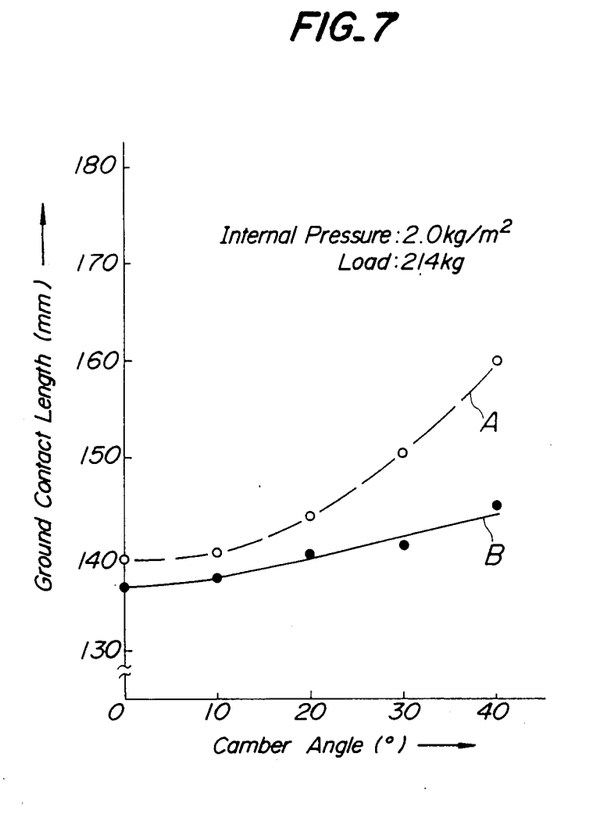
FIG. 7 is a graph showing the change of ground contact length corresponding to chamber angle between the tires of the invention and the prior art.

Among the properties shown in Table 2, the wet skid resistance together with the wear resistance is prominently superior to that of the conventional tire, a cause of which is examined by the inventors as follows. That is, the variation of ground contact length of tire for different camber angles is measured by using the front tire of size 3.25 H 19 to obtain a result as shown in FIG. 7, wherein a broken line curve A is the case of using the tire according to the invention and a solid line curve B is the case of using the conventional tire. As apparent from the comparison of the curves A and B in FIG. 7, the ground contact length of the tire according to the invention considerably increases as the camber angle increases over about 20°. This fact means that the tire is hard to be slipped on road surface at a range of camber angle bringing about the increase of ground contact length.

In this connection, the cord angle of the ply for belt was actually measured with respect to the tire according to the invention under an inflation of internal pressure. As a result, the cord angle with respect to the equatorial plane of the tire is 25° at this equatorial plane, while the cord angle with respect to the circumferential direction of the tire (parallel to the equatorial line) is 28° at a middle position between the equatorial plane and the belt end and 35° at the belt end. Such a change of the cord angle in the widthwise direction of the belt is caused by a unique structure of the belt disposed between the carcass and the tread widely formed along the shape of the carcass at the same thickness. That is, such a difference of cord angle advantageously serves to assure the requirement of the tire for motorcycle in the straight running or cornering as apparent from the following reasons. When the tire is run straight at a high speed without giving the camber angle, only a rigidity in circumferential direction is required for the belt, which is obtained by a smaller cord angle of the ply for belt. On the other hand, when the tire is run on a curved portion at a relatively low speed, a camber angle corresponding to this cornering degree is given to the tire, whereby the ground contact center of the tire is moved toward a side of the tread. As a result, the rigidity in circumferential direction is not required to an extent required in the central portion of the belt, but a rigidity in transverse direction is strongly required, which is obtained by a larger cord angle of the ply for belt. In other words, the change of cord angle in the widthwise direction of the belt results in a difference of rigidity in the widthwise direction of the belt required in the tire for motorcycle, which is a function inherent to the pneumatic radial or semi-radial tire for motorcycle, because the shape of the belt in tires for four-wheeled vehicles is nearly cylindrical and the cord angle thereof is substantially the same at any positions in the widthwise direction of the belt.

According to the invention, tires for motorcycles with a semi-radial structure, which have never been attained in the prior art, can be provided by skillfully combining the peculiar structure of the belt with the reinforcing structure of the sidewall as mentioned above.

What is claimed is:

1. A pneumatic semi-radial tire comprising:
   a tread;
   a pair of sidewalls toroidally extending from said tread;
   a toroidal carcass reinforcing said tread and sidewalls and composed of two rubberized plies each containing organic fiber cords inclined at an angle of 60°–85° with respect to the equatorial plane of the tire, end portions of at least one rubberized ply of said carcass being wrapped around a bead ring embedded in each radially inner end portion of said sidewalls and extending toward said tread to form a turnup portion;
   said tread extending between said sidewalls up to both positions corresponding to a maximum width of the tire parallel to said carcass at substantially an equal thickness;
   a stiffener inclusive of a tapered rubber filler with a Shore A hardness of at least 60° extending from an upper part of said bead ring toward said tread and disposed between said carcass and said turnup portion thereof;
   a belt disposed between said tread and said carcass at a width corresponding to a tread width, said belt laid in parallel as a whole with a contour of the radial section of said toroidal carcass, said belt composed of at least two rubberized plies each containing cords with a modulus of elasticity of at least 600 kg/cm$^2$ arranged at an inclination angle of 15°–30° with respect to the equatorial plane of the tire, said cords of said belt plies being crossed with each other;
   a radial height ($h_1$) of the top end of said stiffener as measured from a bead base being within a range of 50%–75% of a radial height (H) of said sidewall as measured from the bead base and, radial heights ($h_2$) and ($h_3$) of the top ends of said turnup portions of the inner and outer plies of the carcass being located at positions corresponding to at least 60% of said radial height (H) of said sidewall as measured from the bead base, and top ends of said stiffener and turnup portions arranged to provide a gradually decreasing stiffness thereamong in said sidewall toward the tread; and
   one of the rubberized plies of said belt composed of steel cords, each cord formed by twisting 6 to 25 steel filaments with a diameter of not more than 0.12 mm, and having a spacing ratio of 35%–65% defined by $(f-d)/f \times 100$, wherein f is a center distance between cords and d is a diameter of cord, wherein said defined structure is a motorcycle tire.

2. The tire according to claim 1, wherein said stiffener is a composite structure of said rubber filler with at least one reinforcing layer located between said rubber filler and said turnup portion of the carcass and containing cords inclined at an angle of 15°–30° with respect to the circumferential direction of the tire.

3. The tire according to claim 1, wherein said stiffener is a composite structure of said rubber filler with at least one reinforcing layer containing cords inclined at an angle of 15°–30° with respect to the circumferential direction of the tire.

4. The tire according to claim 1, wherein an end part of said turnup portion of the carcass is overlapped with an end part of said belt.

5. The tire according to claim 1, wherein said belt is composed of two rubberized plies each containing metal cords therein.

6. The tire according to claim 1, wherein said belt is composed of one rubberized metal cord ply and one rubberized fiber cord ply, and said metal cord ply is arranged on the side of said carcass.

7. The tire according to claim 1, wherein said belt is composed of one rubberized metal cord ply and one rubberized fiber cord ply, and said fiber cord ply is arranged on the side of said carcass.

8. A pneumatic semi-radial tire of claim 1 wherein said carcass comprises a single rubberized ply and the cords in the turnup portion of said carcass ply are crossed in the sidewalls with the cords of said carcass ply.

9. A pneumatic semi-radial tire of claim 1 wherein said carcass comprises at least two rubberized plies, the cords of said rubberized carcass plies being crossed with each other.

10. A pneumatic semi-radial tire comprising:
    a tread;

a pair of sidewalls toroidally extending from said tread;

a toroidal carcass reinforcing said tread and sidewalls and composed of two rubberized plies each containing organic fiber cords inclined at an angle of 60°–85° with respect to the equatorial plane of the tire, end portions of at least one rubberized ply being wrapped around a bead ring embedded in each radially inner end portion of said sidewalls and extending toward said tread to form a turnup portion;

said tread extending between said sidewalls up to both positions corresponding to a maximum width of the tire parallel to said carcass at substantially an equal thickness;

a stiffener inclusive of a tapered rubber filler with a Shore A hardness of at least 60° extending from an upper part of said bead ring toward said tread and disposed between said carcass and said turnup portion thereof;

a belt disposed between said tread and said carcass at a width corresponding to a tread width, said belt laid in parallel as a whole with a contour of the radial section of said toroidal carcass, said belt composed of at least two rubberized plies each containing cords with a modulus of elasticity of at least 600 kg/cm$^2$ arranged at an inclination angle of 15°–30° with respect to the equatorial plane of the tire, said cords of said belt plies being crossed with each other;

a radial height ($h_1$) of the top end of said stiffener as measured from a bead base being within a range of 50%–75% of a radial height (H) of said sidewall as measured from the bead base and, radial heights ($h_2$) and ($h_3$) of the top ends of said turnup portions of the inner and outer plies of the carcass being located at positions corresponding to at least 60% of said radial height (H) of said sidewall as measured from said bead base, and top ends of said stiffener and turnup portions arranged to provide gradually decreasing stiffness thereamong in said sidewall toward the tread.

* * * * *